United States Patent
Furuta

[19]

[11] Patent Number: 5,959,555
[45] Date of Patent: Sep. 28, 1999

[54] APPARATUS FOR CHECKING BLIND SPOTS OF VEHICLE

[76] Inventor: Yoshihisa Furuta, 3-8 Nakajima 1-chome, Hamamatsu-shi, Shizuoka-ken, Japan

[21] Appl. No.: 08/915,236

[22] Filed: Aug. 20, 1997

[51] Int. Cl.⁶ .................................................. G08G 1/017
[52] U.S. Cl. ...................... 340/937; 340/436; 340/903; 348/148
[58] Field of Search .................................. 340/435, 436, 340/437, 937, 903; 348/148

[56] References Cited

U.S. PATENT DOCUMENTS

| | | | |
|---|---|---|---|
| 5,574,443 | 11/1996 | Hsieh | 340/435 |
| 5,583,495 | 12/1996 | Lulu | 340/435 |
| 5,670,935 | 9/1997 | Schofield et al. | 340/435 |
| 5,680,123 | 10/1997 | Lee | 340/937 |
| 5,699,057 | 12/1997 | Ikeda et al. | 340/937 |
| 5,734,336 | 3/1998 | Smithline | 340/435 |

*Primary Examiner*—Daniel J. Wu
*Attorney, Agent, or Firm*—Varndell & Varndell, PLLC

[57] ABSTRACT

A blind spot checking apparatus comprising an apparatus main body, which is installed on the outside of a vehicle and which is directed toward the view to be taken in by image sensors, and a display apparatus, which is installed inside the vehicle and which displays the graphic information taken in by the above-mentioned image sensors.

7 Claims, 7 Drawing Sheets

APPARATUS FOR CHECKING BLIND SPOTS OF VEHICLE

BACKGROUND OF THE INVENTION

1. Field of the Invention

The present invention relates to an apparatus for checking the blind spots of a vehicle.

2. Description of the Related Art

When a vehicle is taken out of a garage and onto the street, when a vehicle is driven from an alley or the like onto a main street, and so on, the situation in the street cannot be checked until the driver's seat reaches the street, so, particularly with a vehicle that has a hood, care has to be taken to move the vehicle out gradually and not to obstruct other vehicles driving on the street, and this is a hindrance to work.

The areas just and ahead and behind the vehicle are also blind spots, and these blind spots must be checked when the vehicle moves out. This job is performed by the driver before getting into the vehicle, but no check can be made from that point until the vehicle actually moves out, and this is a cause of some apprehension when moving out.

Also, because of the large slip angle of larger vehicles, when a left turn is made with a right-hand-drive vehicle, for example, there is the danger of the rear wheel running over bicycles or other such articles that may be on the left side of the vehicle, and there is also the danger of running up onto the curb or the like. For situations such as these, the driver checks the left side of the vehicle using the side mirror, but a side mirror check is inadequate for checking the wide area extending from near the passenger seat all the way back to the rear wheel. A wide area such as this can be checked if a plurality of mirrors are installed and adjusted to different angles, but looking at all of these mirrors is too much trouble.

SUMMARY OF THE INVENTION

An object of the present invention is to provide an apparatus for checking the blind spots of a vehicle, with which the situation in the blind spots of the above-mentioned vehicle can be checked easily and reliably.

With the blind spot checking apparatus of the present invention, image sensors facing to both sides of the vehicle are installed at the front of the vehicle. The apparatus comprises an apparatus main body, in which graphic information is taken in from both sides of the vehicle by the above-mentioned image sensors, and a display apparatus, which is installed inside the vehicle and displays the graphic information taken in by the above-mentioned image sensors.

Therefore, when a vehicle is taken out of a garage and onto the street, when a vehicle is driven from an alley or the like onto a main street, and so on, the situation in the main street can be checked merely by moving the front end of the vehicle (the apparatus main body) into the main street, which makes driving extremely easy.

Also, with the blind spot checking apparatus of the present invention, an image sensor that faces forward is furnished to the above-mentioned apparatus main body, so that graphic information from in front of the vehicle will also be taken in by the image sensor.

Therefore, the situation in front can also be checked when moving out, there will be no unchecked periods between the time the driver gets into the vehicle and the time the vehicle moves out, and any apprehension that would otherwise be experienced upon moving out is alleviated. Also, when a vehicle is taken from an alley or the like onto a main street, graphic information from in front of the vehicle up until the front end of the vehicle (the apparatus main body) reaches the main street will be displayed on the display apparatus, and this also makes driving extremely easy. Specifically, the situation in front of the vehicle must be directly checked up until the apparatus main body reaches the main street if only graphic information from both sides of the vehicle is displayed on the display apparatus, but if the situation in front of the vehicle can be checked on the display apparatus before the apparatus main body reaches the main street, then the vehicle can be driven while the driver's eyes are on the image of the display apparatus.

Also, the blind spot checking apparatus of the present invention comprises an apparatus main body, which is installed at the front side of the vehicle on the opposite side from the steering wheel, and in which rearward graphic information along the side of the vehicle is taken in by an image sensor, and a display apparatus, which is installed inside the vehicle and displays the graphic information taken in by the above-mentioned image sensor.

To check the situation on the side of the vehicle opposite from the steering wheel, an image sensor is installed facing rearward on the front side of the vehicle opposite the side with the steering wheel.

Therefore, when a turn is made to the side of the vehicle opposite the side with the steering wheel, the area from near the passenger seat to near the rear wheel can be easily checked, there is no danger of the rear wheel running over any bicycles or other such articles that may be on the left side of the vehicle, and there is no danger of running up over the curb or the like.

Also, with the blind spot checking apparatus of the present invention, graphic information from the side of the vehicle is also taken in by the image sensors of the apparatus main body.

To check the situation to the side of the vehicle, one or two additional image sensors are added and installed on one or both sides of the vehicle. The situation on the side of the vehicle on the opposite side from the steering wheel, and the situation to the side of the vehicle on the opposite side from the steering wheel$^{*2}$ can be checked by installing one wide-angle image sensor facing in between to the rear and to the side of the vehicle.

Therefore, when a turn is made in the direction opposite the side of the vehicle with the steering wheel, the situation in the street in that direction can also be checked with ease.

Also, the blind spot checking apparatus of the present invention comprises an apparatus main body, which is installed at the top rear portion of the vehicle on the side opposite from the steering wheel, and in which the side portion viewed along one side of the vehicle and the rear portion viewed along the rear of the vehicle are taken in by an image sensor, and a display apparatus, which is installed inside the vehicle and displays the graphic information taken in by the above-mentioned image sensor.

In this case, two image sensors may be installed facing in each direction, but graphic information from both directions can also be taken in by installing a single image sensor facing downward and in between these directions. When the situation at the rear and on the side of the vehicle on the opposite side from the steering wheel is checked with a single image sensor, the image sensor should be installed facing downward and tilted slightly to the front of the vehicle.

Therefore, the situation at the side portion viewed along one side of the vehicle and at the rear portion viewed along the rear of the vehicle can be checked with ease, and the area near the rear wheel of the vehicle can be easily checked during a turn in the direction on the opposite side of the vehicle from the steering wheel, so there is no danger of the rear wheel running over a bicycle or the like that is on the left side of the vehicle, nor is there any danger of running up onto the curb or the like. Also, since the blind spot to the rear can be checked when backing up, there is no unchecked period between the time the driver gets into the vehicle and the time the vehicle starts backing up, which eliminates the apprehension that would otherwise be experienced.

Also, with the blind spot checking apparatus of the present invention, the other rear side end viewed along the rear of the vehicle is also taken in by the image sensor of the above-mentioned apparatus main body.

Furthermore, in order to check the situation to the side along the rear of the vehicle, another one or two image sensors are added and installed facing to one side or to each side.

Therefore, when the vehicle is put into a garage or the like, the presence of any obstacles to the rear and on the rear side portion on the opposite side of the vehicle from the steering wheel can be checked, which makes it easier to park in the garage. When the vehicle is backed out of a garage or the like and onto a street, the situation in the street can be checked.

CCD (Charge Coupled Device) image sensors are favorable as the image sensors employed in the apparatus main body of the present invention. The image sensors that are used may be housed in a transparent plastic case.

The graphic information taken in by the image sensors is displayed on a split display screen of a display apparatus by a known method.

In any case, the orientation of the image sensors is adjusted as needed up and down and to the left or right. For instance, when the apparatus main body is installed in the middle of the front bumper, graphic information is taken in by the image sensors that check the situation to the side such that about half of the field of vision is taken up by the vehicle, and the other half by a view of the surroundings to the side of the vehicle. If one wishes to expand the range of the view taken in by the image sensors, the installation angle should be adjusted so that the orientation of the image sensors is moved slightly away from the vehicle. In the case of a sensor that checks the blind spot in front to the vehicle, the orientation of the image sensor should be pointed slightly downward in order to obtain graphic information from close to the bumper.

The graphic information taken in by a plurality of image sensors is subjected to suitable image processing, and the required portion of the range is displayed as a split screen on a display apparatus. The surface area, positioning, and so on of the displayed images are determined as desired.

DETAILED DESCRIPTION OF THE PREFERRED EMBODIMENTS

Figure 1:
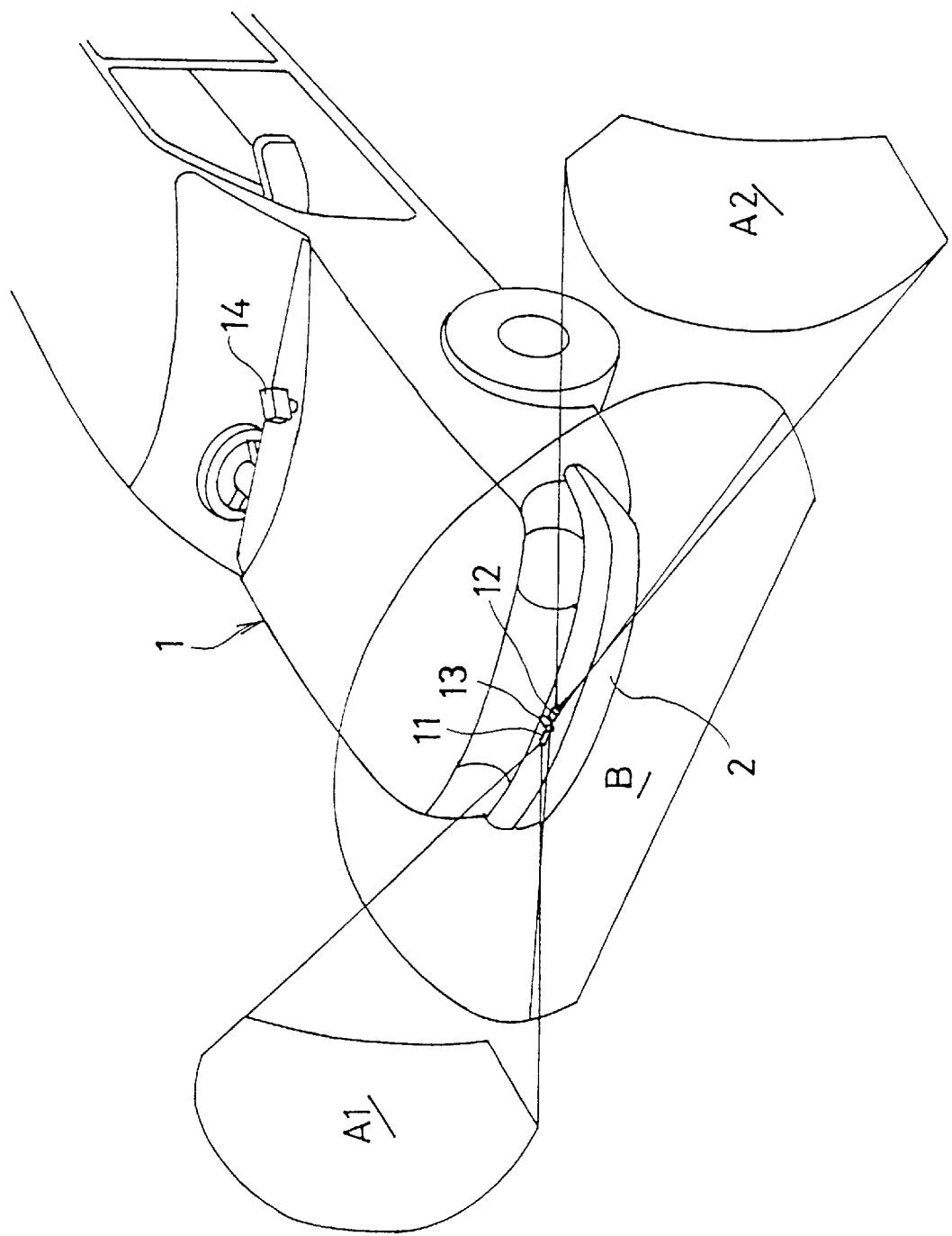
FIG. 1 illustrates a practical example of the vehicle blind spot checking apparatus pertaining to the present invention, and is an oblique view showing the range in which graphic information is taken in and the installation position of the apparatus main body.
Figure 2:
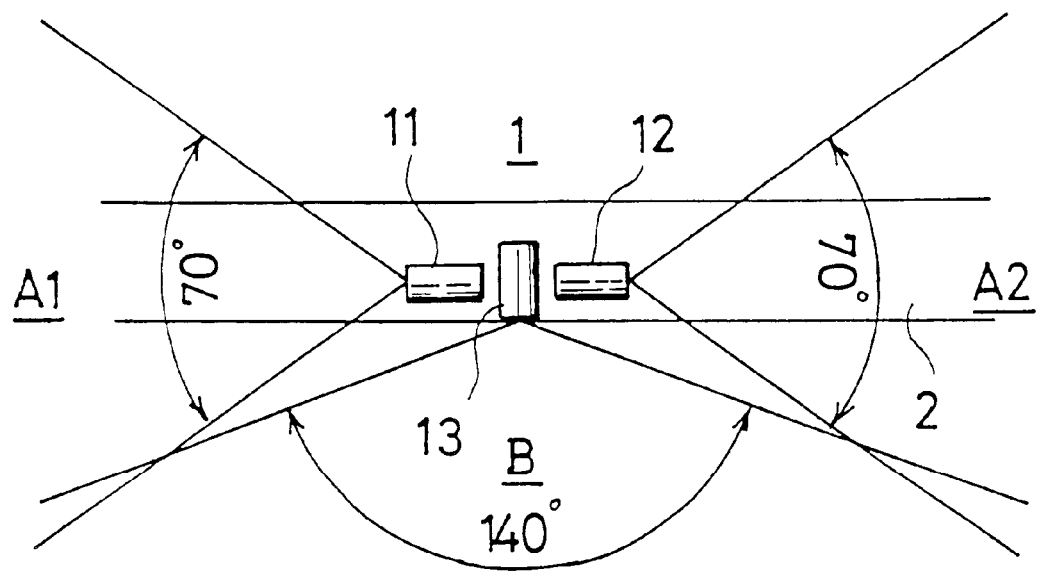
FIG. 2 is a plan view showing an enlargement of how the image sensors are installed in FIG. 1.

FIG. 1 illustrates a practical example in which an apparatus main body 10 is installed in the middle of the front bumper 2 of a vehicle 1 having a hood. This apparatus main body 10 comprises three image sensors 11, 12, and 13. As shown in FIG. 2, the image sensors 11 and 12 are installed facing to the left and right of the vehicle 1, and the image sensor 13 is installed facing to the front of the vehicle 1. Graphic information A1 and A2 over a field of vision of 70 degrees is taken in by the image sensors 11 and 12, and graphic information B over a field of vision of 140 degrees is taken in by the image sensor 13.

Figure 3:
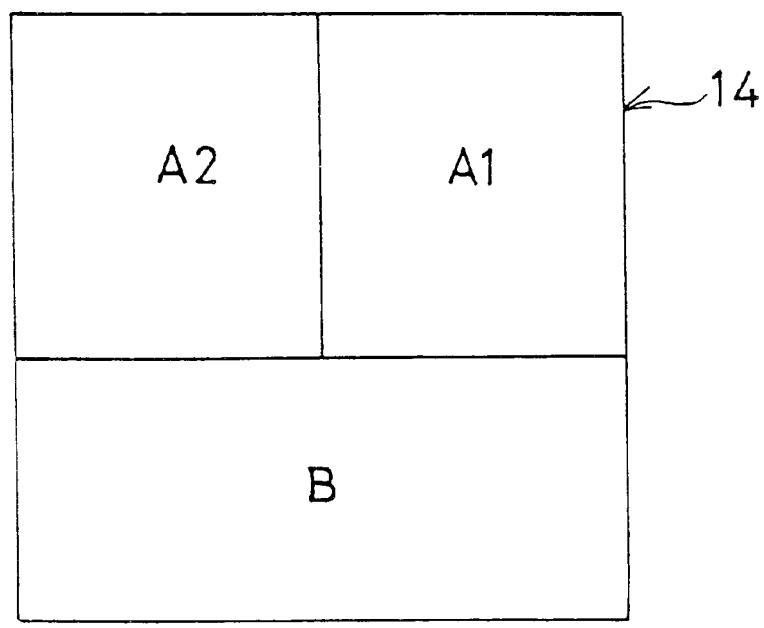
FIG. 3 is a diagram illustrating how the graphic information taken in by the apparatus main body in FIG. 1 is displayed on a split screen on the display apparatus.

The graphic information A1, A2, and B taken in by the various image sensors 11, 12, and 13 is subjected to suitable image processing, and the required portions of the range are displayed on a split screen as shown in FIG. 3 on the display component of a display apparatus 14 installed in the interior of the vehicle 1.

Figure 4:
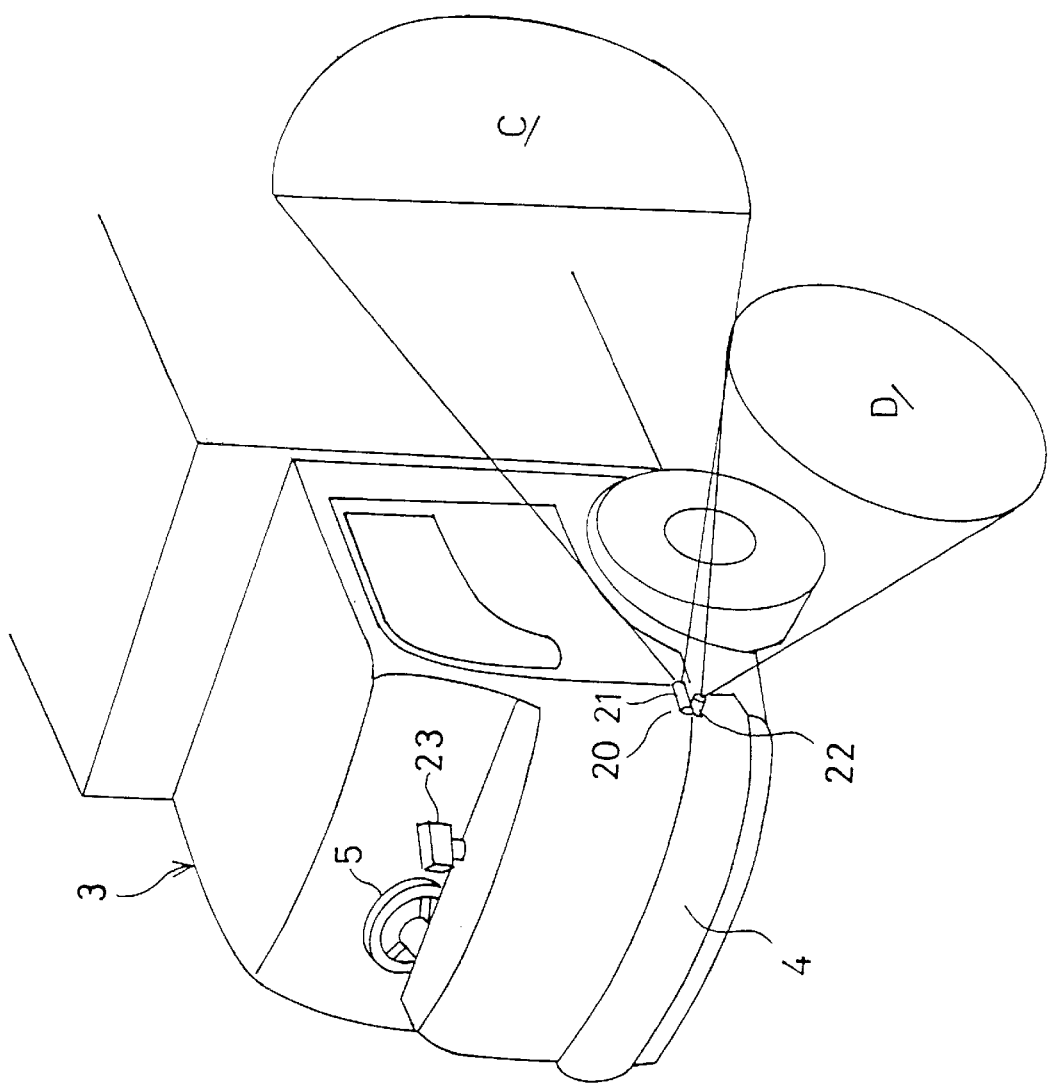
FIG. 4 illustrates another practical example of the vehicle blind spot checking apparatus pertaining to the present invention, and is an oblique view showing the range in which graphic information is taken in and the installation position of the apparatus main body.
Figure 5:
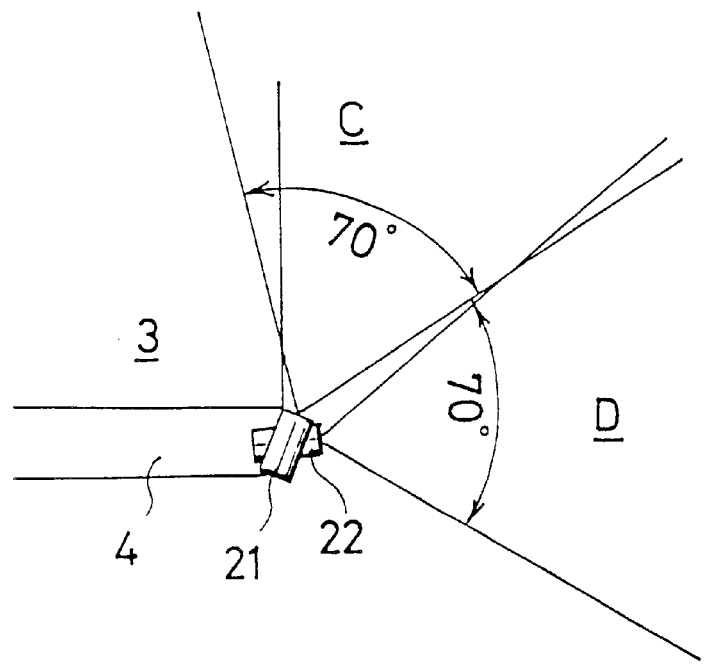
FIG. 5 is a plan view showing an enlargement of how the image sensors are installed in FIG. 4.

FIG. 4 illustrates a practical example in which an apparatus main body 20 is installed on the side end (left side) on the opposite side from the steering wheel 5 on the front bumper 4 of a van type of vehicle 3. This apparatus main body 20 comprises two image sensors 21 and 22. As shown in FIG. 5, the image sensor 21 is installed facing to the rear along the side of the vehicle 3, and the image sensor 22 is installed facing to the left side of the vehicle. Graphic information C over a field of vision of 70 degrees is taken in by the image sensor 21, and graphic information D over a field of vision of 70 degrees is taken in by the image sensor 22.

Figure 6:
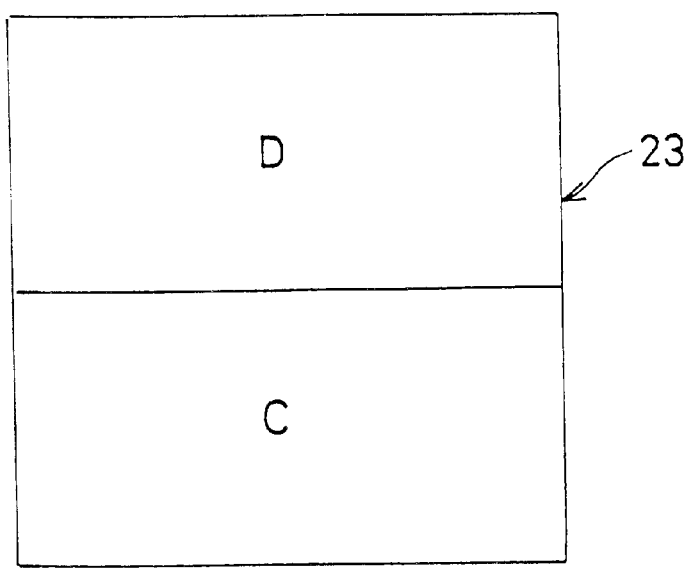
FIG. 6 is a diagram illustrating how the graphic information taken in by the apparatus main body in FIG. 4 is displayed on a split screen on the display apparatus.

The graphic information C and D taken in by the image sensors 21 and 22 is subjected to image processing as needed, and the required portions of the range are displayed on a split screen as shown in FIG. 6 on the display component of a display apparatus 23 installed in the interior of the vehicle 3.

Figure 7:
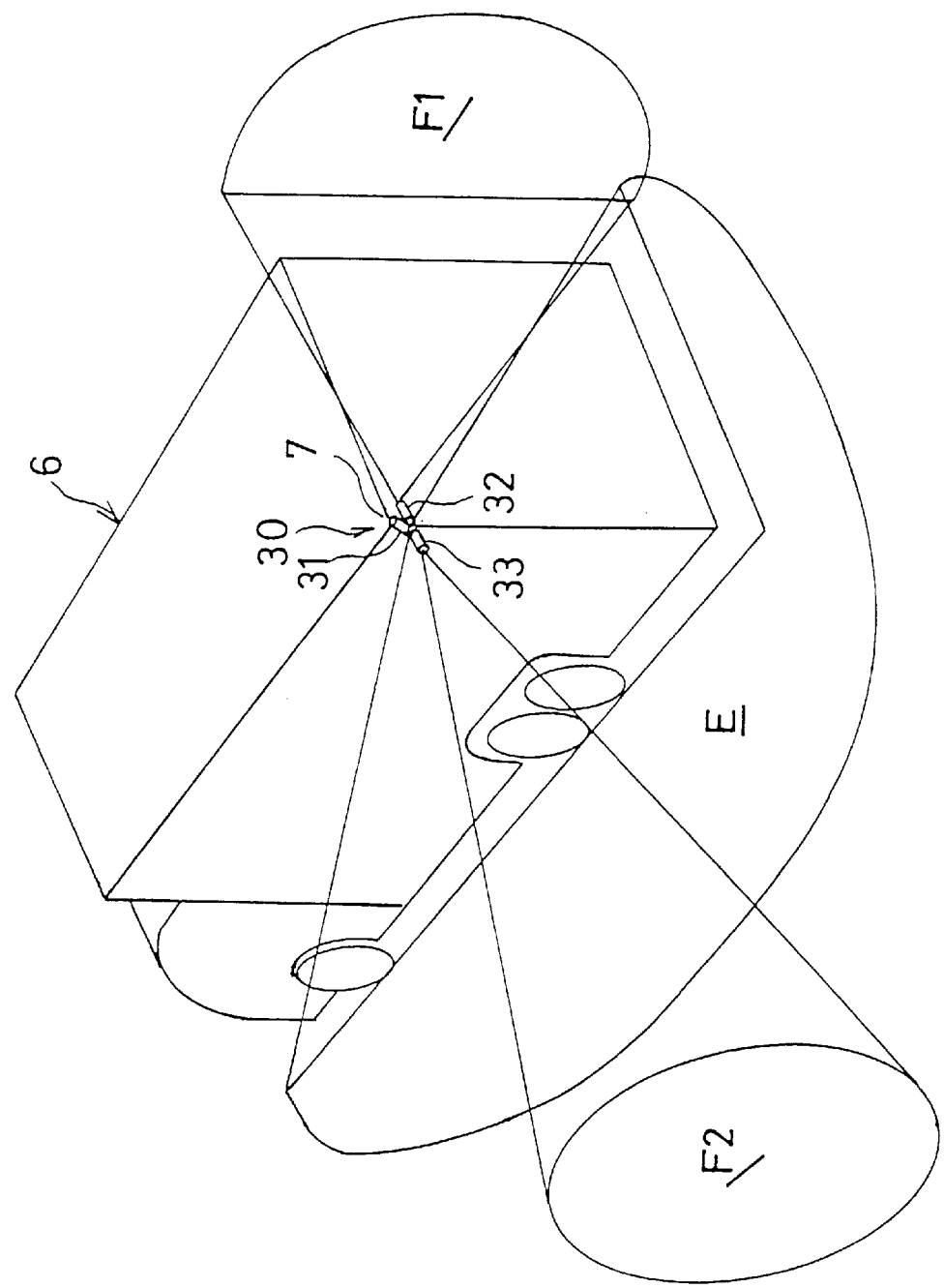
FIG. 7 illustrates another practical example of the vehicle blind spot checking apparatus pertaining to the present invention, and is an oblique view showing the range in which graphic information is taken in and the installation position of the apparatus main body.
Figure 8:
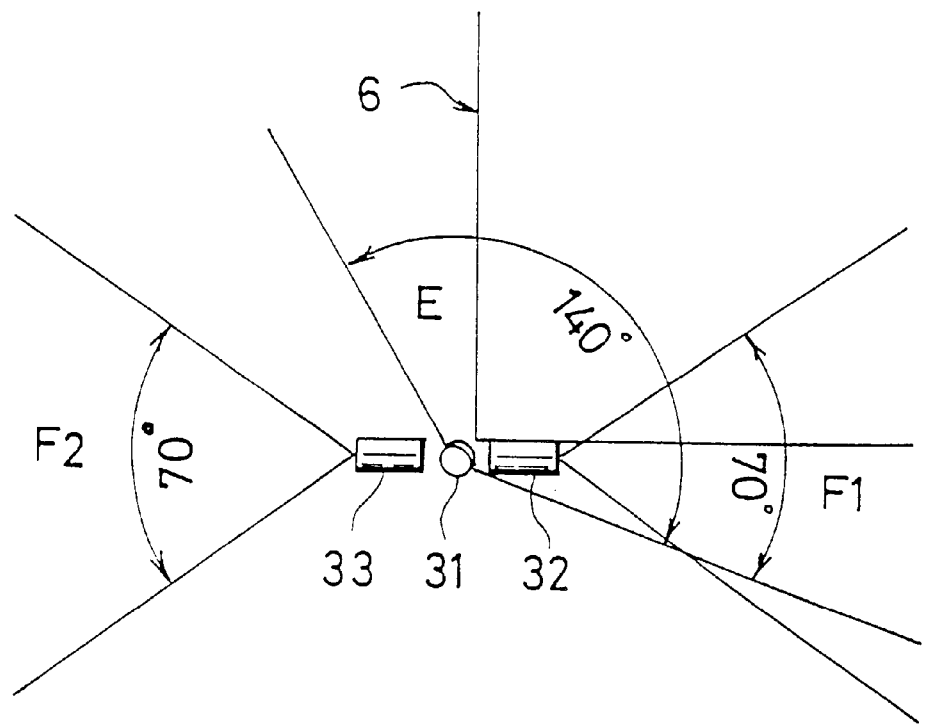
FIG. 8 is a plan view showing an enlargement of how the image sensors are installed in FIG. 7.

FIG. 7 illustrates a practical example in which an apparatus main body 30 is installed on the rear end upper portion on the opposite side from the steering wheel on a van type of vehicle 6. This apparatus main body 30 comprises three image sensors 31, 32, and 33. The image sensor 31 is installed facing downward from the vehicle 6 and tilted slightly to the front of the vehicle, and the image sensors 32 and 33 are installed facing to both sides of the vehicle 6. Graphic information E over a field of vision of 140 degrees of the portion along the rear and the portion along the side of the vehicle 6 is taken in by the image sensor 31, and graphic information F1 and F2 over a field of vision of 70 degrees is taken in by the image sensors 32 and 33.

Figure 9:
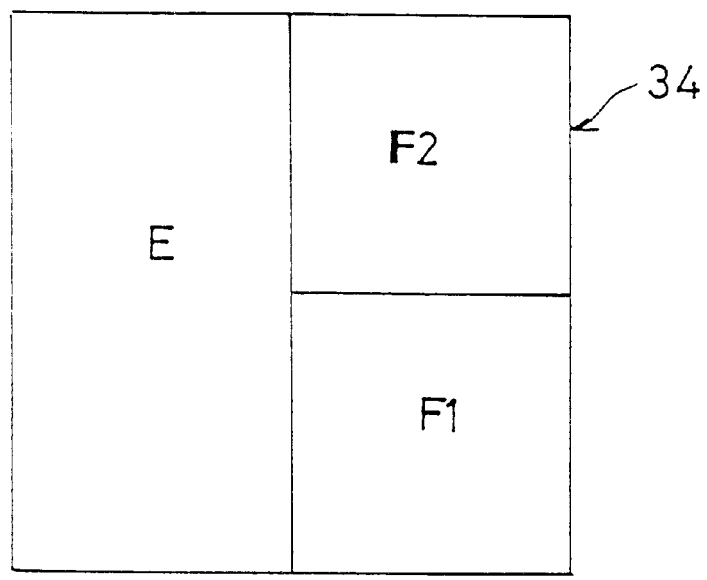
FIG. 9 is a diagram illustrating how the graphic information taken in by the apparatus main body in FIG. 7 is displayed on a split screen on the display apparatus.

The graphic information E, F1, and F2 taken in by the image sensors 31, 32, and 33 is subjected to image processing as needed, and the required portions of the range are displayed on a split screen as shown in FIG. 9 on the display component of a display apparatus 34 installed in the interior of the vehicle 6.

Figure 10:
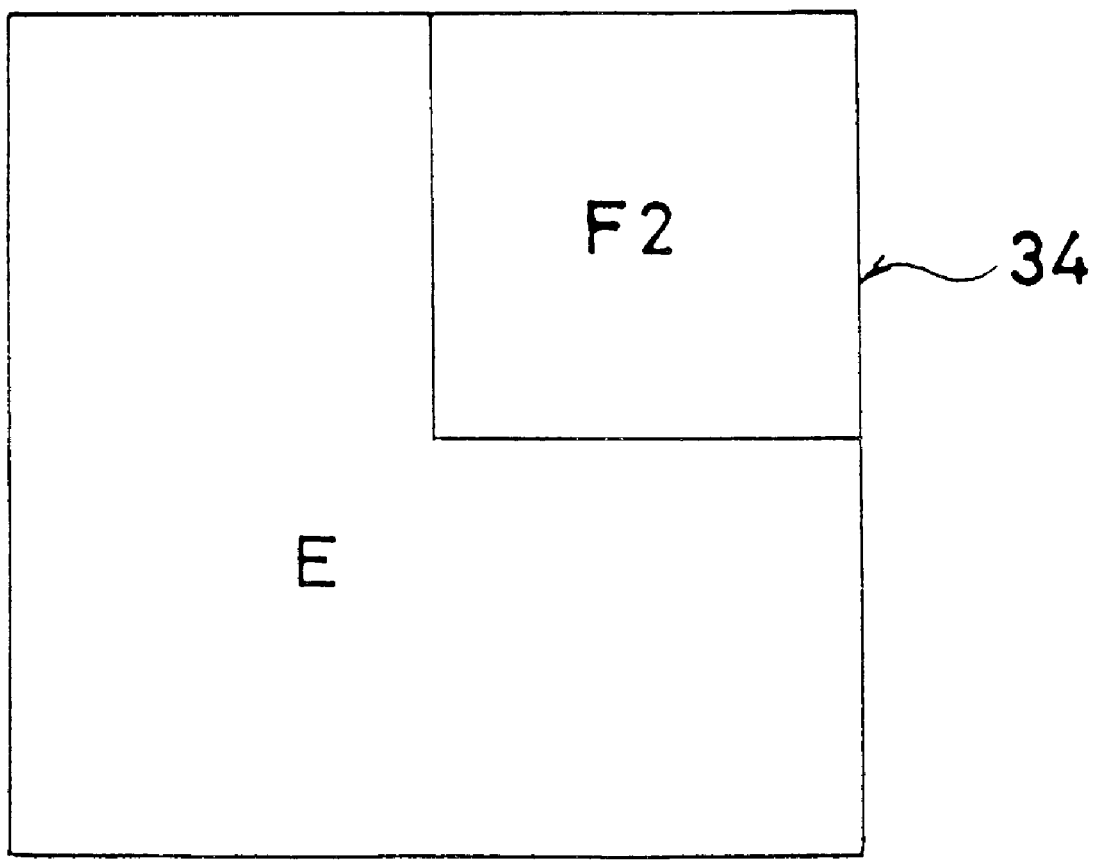
FIG. 10 is a diagram illustrating how the graphic information taken in by the apparatus main body in FIG. 7 is displayed on a split screen on the display apparatus in a variation example.

As a variation example of the practical example illustrated in FIG. 7, two image sensors 31 and 33 can be installed at the rear end upper portion 7 of the vehicle, and the graphic information taken in by these image sensors 31 and 33 can be displayed on a split screen as shown in FIG. 10 on the display component of the display apparatus 34.

The display apparatus of a navigation system, a television, or the like can be used as the display apparatus in the present invention.

What is claimed is:

1. A blind spot checking apparatus for a vehicle comprising:

image sensors means, facing in opposite directions and arranged at a front of the vehicle, for capturing side images of graphic information in opposing directions perpendicular to a longitudinal direction of the vehicle at the front of the vehicle;

an apparatus main body including the image sensor means; and display means, arranged inside the vehicle, for displaying the side images of graphic information captured by the image sensor means.

2. The blind spot checking apparatus of claim 1, wherein the sensor means includes an additional means, facing forward relative to the vehicle, for capturing a forward image of graphic information in the longitudinal direction ahead of the vehicle, and the display means displays the side images and the forward image of graphic information captured by the sensor means.

3. A blind spot checking apparatus for a vehicle, which comprises an apparatus main body arranged at a front of the vehicle on a side opposite a steering wheel side of the vehicle, the apparatus main body including image sensors means for capturing a side image of graphic information in a direction perpendicular to a longitudinal direction of the vehicle at the front of the vehicle; and display means, arranged inside the vehicle, for displaying the side image of graphic information captured by the image sensor means.

4. The blind spot checking apparatus of claim 3, wherein the sensor means includes additional means, facing backward relative to the vehicle, for capturing a backward image of graphic information in the longitudinal direction along the side opposite the steering wheel side of the vehicle, and the display means displays the image graphic information captured by the additional sensor means.

5. A blind spot checking apparatus for a vehicle comprising:

an apparatus main body including an image sensor means, arranged at a top and a rear of the vehicle on a side opposite a steering wheel side of the vehicle, for capturing a side image of graphic information in a direction perpendicular to a longitudinal direction of the vehicle at the rear of the vehicle and for capturing a rearward image of graphic information in the longitudinal direction behind the vehicle; and a display means, installed inside the vehicle, for displaying the side and rearward images of graphic image information captured by the image sensor means.

6. The blind spot checking apparatus of claim 5, wherein the image sensors means, includes image sensors facing in opposite directions, for capturing opposing side images of graphic information in directions perpendicular to a longitudinal direction of the vehicle at the rear of the vehicle, and the display means displays the opposing side images and the rearward image of graphic information captured by the sensor means.

7. The blind spot checking apparatus of claim 5, wherein the image sensor means includes an image sensor arranged at a downward angle for capturing a rearward ground image of graphic information for the ground directly behind the vehicle, and the display means displays the side image and the rearward ground image of graphic information captured by the sensor means.

* * * * *